United States Patent [19]

Bauer et al.

[11] Patent Number: 4,795,564

[45] Date of Patent: Jan. 3, 1989

[54] PROCESS FOR IMPROVING THE SEDIMENTATION AND FILTERING PROPERTIES OF WASTE WATERS CONTAINING CLAY MINERALS

[75] Inventors: Sándor Bauer, Nagykanizsa; Sándor Doleschall; András Gál, both of Budapest; Gyula Milley, Nagykanizsa; Gyula Nagy, Nagykanizsa; Tibor Paál, Nagykanizsa, all of Hungary

[73] Assignee: Magyar Szenhidrogenipari Kutato-Fejleszto Intezet, Szazhalombatta, Hungary

[21] Appl. No.: 61,784

[22] Filed: Jun. 11, 1987

[30] Foreign Application Priority Data

Jun. 24, 1986 [HU] Hungary .............................. 2641/86

[51] Int. Cl.$^4$ .............................................. C02F 1/52
[52] U.S. Cl. .................... 210/665; 210/712; 210/723; 210/726; 210/778
[58] Field of Search .................. 71/61; 210/702, 712, 210/723, 724, 726, 727, 778, 665

[56] References Cited

U.S. PATENT DOCUMENTS

| 2,468,188 | 4/1949 | Frankenhoff | 210/778 |
| 3,285,849 | 11/1966 | Watanabe et al. | 210/728 |
| 3,398,093 | 8/1968 | Ferney | 210/737 |
| 3,892,640 | 7/1975 | Furuta | 210/702 |

FOREIGN PATENT DOCUMENTS

| 56-45794 | 4/1981 | Japan | 210/725 |
| 923960 | 4/1982 | U.S.S.R. | 210/727 |

*Primary Examiner*—Peter Hruskoci
*Attorney, Agent, or Firm*—Herbert Dubno; Jonathan Myers

[57] ABSTRACT

The invention relates to a process for improving the sedimentation and filtering properties of waste waters and/or slurries and muds containing clay minerals. The waste waters and/or slurries obtained in the various technologies and containing clay minerals and optionally also other solid components are treated with compounds containing ions having a hydrated ionic diameter of from 0.12 to 0.15 nm and a co-ordination number of 12.

10 Claims, No Drawings

4,795,564

PROCESS FOR IMPROVING THE SEDIMENTATION AND FILTERING PROPERTIES OF WASTE WATERS CONTAINING CLAY MINERALS

The invention relates to a process for improving the sedimentability and filterability of waste waters and/or slurries and muds containing clay minerals.

Numerous flocculating procedures, flocculation promoting reagents and mechanical and combined technical solutions are known from the industrial practice and the art for improving the filterability and sedimentability of waste waters containing also clays beside the solid components (e.g. DE-AS No. 1,119,826; U.S. Pat. No. 3,398,093, Hungarian Pat. No. 115,111; chapters of colloid chemistry monographies on flocculation, cf. e.g. H. von Olphen: An Introduction of Clay Colloid Chemistry, Wiley Interscience Publ., New York, etc.). The shortcomings of the mentioned solutions are as follows:
- the price of the flocculating reagents is high,
- though these reagents increase the sedimentability they make the water-removing step (filtration) more complicated,
- a substance foreign to the environment is added to the liquid phase to be eliminated,
- for the application generally a multi-step technology is required with expensive equipment,
- the applied flocculating agents, mainly the polymer-based ones (e.g. polyelectrolytes, such as polyacrylamide-, methylcellulose, or bipolymer-based ones) are extraordinarily sensitive to the oxidizing effects, to the presence of the multivalent cations (e.g. calcium, magnesium, aluminium, iron) being present in the aqueous phase, to the shearing force, furthermore, to the bacteria being present everywhere; during the technological procedure the above effects may cause a degradation of such an extent that the agents loose their activity mostly or totally,
- these flocculating agents exert no structural effect on the clay minerals, in particular on the clay minerals with swelling capacity (e.g. montmorillonite, bentonite, nontronite, vermiculite, etc.) and do not hinder the dipsersion thereof, thereof all technological difficulties caused by the presence of clay minerals remain unchanged despite the use of flocculating agents.

According to the present invention the improvement of the sedimentability and filterability of the solid material content of industrial waste waters containing also clay minerals is approached not on the basis of the usual flocculation principles but from the side of the clay minerals which exert a very unpleasant influence on the system. If, namely, coagulation and particle density increase and dispersion stability of the clay minerals, in particular of the clay minerals with swelling capacity are achieved by the addition of a proper additive, then a flocculation to a certain extent occurs due to the electrostatic interactions and the surface hydration and charge of the particles. This flocculation influences favorably the overall sedimentability and filterability of the whole system.

It has been found that this effect may be ensured by any inorganic or organic compound having a positive radical or a hydrated cation with a diameter of from 0.12 to 0.15 nm and a co-ordination number of 12, which is able to replace the calcium, magnesium or sodium ions of the clay minerals in an irreversible manner. Thereby the cell-unit is contracted towards the C-axis with a high strength, thus increasing the particle density (thereby making the sedimentation faster) and increasing the stability against the dispersion. The clay mineral particles treated in this way work as flocculation centres, that is sedimentability and filterability of the whole system are changed favorably.

Accordingly, the object of the invention is a process for improving the sedimentability and filterability of waste waters and/or slurries and muds containing clay minerals. Pursuant to the invention the waste waters and/or slurries and muds obtained in the various technological processes and containing clay minerals and optionally also other solid components are treated with compounds containing ions having a hydrated ionic diameter of from 0.12 to 0.15 nm and a co-ordination number of 12, applying said compounds in a concentration of from 0.0005 to 500 kg/t solid material, preferably of from 0.001 to 400 kg/t solid material.

The essence of the invention is to provide a method for the improvement of purification of industrial waste waters containing clays, especially clays having a swelling capacity, in addition to the other solid impurities (e.g. coal dust, phosphates, ash, ore dusts, etc.) removing of which from an aqueous phase is very expensive and in most cases even impossible using the conventional technologies and reagents. The invention is based on the technical procedure of treating waters and slurries containing clay minerals, especially clay minerals having a layer structure of 2:1 and a swelling capacity, with ions having a hydrated ionic diameter of from 0.12 to 0.15 nm and a co-ordination number of 12, or with compounds containing such ions; the above ions are inserted into the structure of the clay minerals by ion exchange and they are fixed there, thus decreasing the size of the cell-unit measured towards the C-axis, that is decreasing hydration of the clay minerals, hence also their ability to be dispersed, and simultaneously increasing the density and stability of the mineral particles, consequently increasing their sedimentability and filterability.

Depending upon the numerous types, chemical state and chemical environment of clay minerals, upon the other solid components present in the waste waters and granulometric characteristics of the dispersed system the aim of the invention can be reached with numerous compounds, from which preferably the various inorganic or organic potassium, ammonium, cesium or zirconium derivatives may be chosen, in a concentration depending on the feature of the dispersed system to be treated and amounting to 0.0005 to 500 kg/t solid material, preferably 0.001 to 400 kg/t solid material. In case of a complex system the mixtures of the above compounds are used in a concentration of from 0.0005 to 500 kg/t solid material, preferably of from 0.001 to 400 kg/t solid material. The compounds and/or mixture thereof chosen for the treatment on the basis of laboratory-scale experiments are added to the suspensions dissolved in water or in organic solvents or, in special cases, in a gaseous or vapor phase. When the reaction time required for the treatment is over, the solid material content of the treated waters or slurries may be removed by technological methods and means known per se.

Thus the subject of the invention in particular does not fall into the field of flocculation, nevertheless, it is possible to use and apply the invented method in flocculation processes, together with the application of flocculating agents known per se; this may play an important role in all industrial technological solutions to be considered as complicated ones, in which the dispersion that has to be freed of water, i.e. the muds, slurries or suspensions contain not only solid materials to be eliminated or further reused, but in addition also clay minerals which make any known technology more expensive and more difficult to perform; such clay minerals are present mainly as solid particles of micron size or of colloidal size.

As a rule, the compounds applicable as treating reagents have such a chemical character that they are not detrimental from the viewpoint of environment protection, but they even promote recultivation activity in numerous respects.

The reagents used as treating agents contain the mentioned cations, i.e. potassium, ammonium, cesium or zirconium ions together with inorganic or organic anions. The inorganic anions may be e.g. the chloride, nitrate, carbonate, bicarbonate, phosphate and hydroxide. The organic anion may be e.g. the acetate, citrate and formiate.

The anion of the applied reagent is chosen on the basis of the pH-value of the waste water or slurry to be treated, and on the basis of the way of disposing the liquid phase to be eliminated. Preferably applicable reagents are e.g. the potassium chloride and the ammonium chloride, or a mixture thereof. These reagents are in use as fertilizer components so the waters treated with them may be disposed e.g. on agricultural territories. The reagents are generally applied at a ratio higher than the stoichiometric one, at a concentration of from 0.0005 to 500 kg/t solid material, preferably of from 0.001 to 400 kg/t solid material. The reagents are conveniently applied in dissolved form; as a solvent water or an organic solvent may be used, or the reagents can be applied in gaseous or vapor phase. The addition of reagents may be performed portionwise or continuously with a treating solution of standard concentration, or with a solution of stepwise decreasing concentration added portionwise or continuously. The treatment may also be performed in a recirculation system, always using the filtrate obtained from the filtration for the treatment of a new portion of untreated slurry. In such a case the slight diminishment of the reagent is supplied from time to time.

The process of the invention may be applied advantageously for the treatment of any kind of clay-containing waste waters and slurries and muds, which may contain also other solid components in addition to the clay minerals, e.g. waters and slurries obtained in the course of coal and ore mining and containing coal dust or ore dust, futhermore waters and slurries containing ash, phosphate, etc., and wash waters of vegetables and fruits obtained in the food industry, etc.

Communal waste waters are also to be considered as industrial waste waters, although their clay-content varies intensively and their organic material content may embrace a wide variety of organic compound groups. Dry substance content and organic material content of the communal waste waters varies within a wide range depending on the seasonal performance of the surrounding factories, but the purification has always to be solved. In cases when the floating solid material content of the communal waste waters is relatively high, e.g. is between 5 to 20 g/l, the removal of the solid material, that is removal of the water on the mud depends not only from the total solid material content and quality thereof, but also—taking into account the conventional filtering methods—from the morphological appearance and the concentration of the solid material content.

It has been demonstrated experimentally that filterability is highly dependent on the quantity of the solid impurities in addition to the chemical structure thereof. Consequently, when such waste waters of relatively low solid material content should be filtered, which give thixotropic muds, moreover, which can not be concentrated sufficiently with the conventional techniques considered as up-to-date, it is advisable to increase the solid material content of the water before filtration. For this purpose one or more additives not contaminating the environment can be used, which favorably influence morphology of the particles to be filtered due to interactions among the particles, simultaneously promote applicability (agricultural use) of the mud (filtrate), and which at the same time essentially influence effectiveness of the purification operation by ensuring a higher permeability of the filter cake and by increasing effectiveness of the technological equipment (pressure band filter, centrifuge, hydrocyclone, etc.).

Such reagents applied together with the previously described compounds exerting an effect on clay minerals lead to the improvement of sedimentability and filterability of industrial waste waters, and thereby a significant purification effectiveness and economic result can be achieved at low cost.

As solid materials having proper granulometric properties and applicable for the improvement of filterability and for optimalization of the dry substance one may use various non-swelling materials, e.g. micas, zeolites, kalolinites, etc., ground lime stone, dolomite or quartz, ground brown or black coal of various types, ground peat etc. Particle size distribution and chemical character of the above materials are substantially determined by the organic material and floating solid material content of the waste water to be treated, as well as by the chemical surroundings, and the treating method must always be fitted to the above circumstances in a controlled manner. The amount of the grained material added for increasing the solid material content may be from 0 to 500 g/l, preferably from 0.0001 to 400 g/l, in line with the quantity depending on the chemical surroundings.

The advantages of the process according to the invention are that the compounds used for the improvement of sedimentability and filterability of clay minerals are inexpensive, furthermore that these treating agents provide a long treating time in a closed technological system, since their actual chemical consumption takes place only in the course of incorporation reaction, thus e.g. after one filling of a closed-system clarifier it is of from 1 to 10% of the treating reagent that may have to be supplied afterwards. Contrary to the polymer-tape flocculating agents these treating reagents are not sensitive to oxidative effects and to the ionic environment containing multivalent cations, further they are heat-resistant and are not degraded by the bacteria.

The process of the invention is illustrated by the following non-limiting examples.

EXAMPLE 1

A coal slurry with a dry substance content of 40 kg/m$^3$ and containing a coal dust with an ash content of about 40%, (including 22 to 27% clay mineral content) was treated with the process of the invention. The filtering velocity for the untreated material was 32.6 kg $m^{-2}h^{-1}$.

For the treatment an aqueous solution of a compound containing a cation having a hydrated ionic diameter of 0.123 nm was used; in fact it was a potassium chloride solution of 20 kg/m³ concentration. The treating reagent was added to the dispersion medium of the slurry as a stock solution having a concentration of 200 kg/m³ in the necessary amount. In accordance with the plant technology a contacting time of four hours was ensured, with stirring of the slurry from time to time. After the treatment, the filtering velocity was 63.8 kg $m^{-2}hour^{-1}$, so the filterability improved significantly which means that the filtering capacity of the plant has been doubled.

EXAMPLE 2

The coal slurry of Example 1 was treated with the treating reagent described in Example 1 used in the concentration given above; the treating was performed so that after the filtration the filtrate was always used for the treatment of a new, untreated slurry, that is a recirculation process was realized. The contacting time ensured during the treating cycles was 4 hours in each case. The filtering velocity for the untreated slurry was 32.6 kg $m^{-2}hour^{-1}$.

The filtering velocities reached by the treating cycles are as follows:
  after the first cycle 64.0 kg $m^{-2}hour^{-1}$
  after the second cycle 61.7 kg $m^{-2}hour^{-1}$
  after the third cycle 60.3 kg $m^{-2}hour^{-1}$
  after the fourth cycle 63.2 kg $m^{-2}hour^{-1}$
  after the fifth cycle 59.5 kg $m^{-2}hour^{-1}$
  after the sixth cycle 60.2 kg $m^{-2}hour^{-1}$ These data show that the actual decrease in the amount of the treating reagent (due to an incorporation reaction) was slight; in the case of continuous operation a small amount had to be supplied in about each 96th hour.

The water content of the filter cake altered between 22 and 27 percent by weight and the treating reagent dissolved in such an amount of water could be recovered and recycled with one flushing operation step.

EXAMPLE 3

The coal slurry of Example 1 was treated with a solution of a compound containing a cation having a hydrated ionic diameter of 0.129 nm and a co-ordination number of 12, in fact with an ammonium chloride solution of 20 kg/m³ concentration. The necessary treating concentration was adjusted starting from a more concentrated stock solution. The measured filtering velocity after a contacting time of 4 hours was 75.2 kg $m^{-2}h^{-1}$, while the filtering velocity for the untreated washings was 32.6 kg $m^{-2}h^{-1}$. The water content of the filter cake was 24 percent by weight.

EXAMPLE 4

The slurry of Example 1 was treated with the following treating reagent: a solution of 20 kg/m³ concentration containing compounds having cations with a hydrated ionic diameter of 0.129 nm and 0.123 nm (potassium chloride and ammonium chloride) in a weight ratio of 1:1. The contacting time was 4 hours. Filtering velocities before treatment and thereafter; 32.6 and 77.4 kg $m^{-2}h^{-1}$, respectively. The water content of the filter cake was 22.1 percent by weight.

EXAMPLE 5

The slurry to be treated was a mud containing montmorillonite and illite, having a prevailing particle size below 10 μm and a dry substance content of 25 kg/m³, the mud being dispersed in an alkali phosphate (sodium biphosphate) solution of a concentration of 150 kg/m³.

The treatment was performed with a 10 kg/m³ concentration solution of a compound having a cation with a hydrated ionic diameter of 0.123 nm (potassium chloride). Treatment contacting time: 0.5 hour. The filtering velocity before treatment was 3.6 kg $m^{-2}h^{-1}$, thereafter it was 50.7 kg $m^{-2}h^{-1}$. The water content of the filter cake was 27.3 percent by weight. Dry substance content of the filtrate was less than 0.005 kg/m³.

EXAMPLE 6

A communal waste water having a low dry substance content was treated as follows. The communal waste water had a dry substance content below 10 g/l; previously it had been treated with a polyelectrolyte flocculating agent and was unfilterable due to thixotropic properties. It was treated with compounds containing cations having hydrated ionic diameters of 0.123 nm and 0.129 nm and a co-ordination number of 12 (potassium chloride and ammonium chloride in a ratio of 1:1) applied in a concentration of 10 kg/m³ calculated to the treated slurry. The treatment was performed in the presence of 10 kg/m³ dry substance content-increasing additive (linestone dust). The contacting time was 0.5 hour. The sedimentation velocity increased from 0.8 cm/0.5 h (original untreated sample) to 10.2 cm/0.5 h, the filterability increased from 13 kg $m^{-2}h^{-1}$ to 46 kg $m^{-2}h^{-1}$.

EXAMPLE 7

A communal waste water containing b 7 g/l dry substance and previously not treated with a polyelectrolyte, was treated with 1 kg/m³ additives containing cations having ionic diameters of 0.123 nm and 0.129 nm and a co-ordination number of 12 (potassium chloride and ammonium chloride in a ratio of 1:1), as well as with 10 kg/m³ filterability-increasing additive (limestone dust). After a contacting time of 0.5 hour the original sedimentation velocity of 0.5 cm increased to 9.5 cm and the filterability of 0.8 kg $m^{-2}h^{-1}$ improved to 52 kg $m^{-2}h^{-1}$.

We claim:

1. A method of treating a solids-containing waste water having swellable clay minerals containing calcium, magnesium, or sodium ions forming part of the solids content thereof, said method consisting essentially of the steps of:
    (a) adding to said waste water having swellable clay minerals forming part of the solids content thereof an effective quantity of at least one compound dissociatable into ions having a hydrated ionic diameter of 0.12 to 0.15 nanometers and a coordination number of 12, said compound selected from the group consisting of the salts of potassium, ammonium, cesium and zirconium, formed with an inorganic or organic anion to replace by ion exchange the ions in the swellable clay material with the cations of said compound in an irreversibile manner, to decrease hydration as well as ability to be dispersed and to simultaneously increase density and stability of particles of said swellable clay minerals, thus increasing sedimentability and filterability of said waste water;

(b) controlling said quantity of said compound so that a concentration of 0.0005 to 500 kg of said compound is maintained per metric ton of solids in said waste water; and (c) thereafter separating solids from liquid of said waste water.

2. A process according to claim 1 wherein a combination of said compounds are added.

3. A process according to claim 1 wherein said concentration is 0.001 to 400 kg/t.

4. A process according to claim 1 wherein said compound is added in the in form of an aqueous solution, organic solvent solution or in gaseous or vapor phase.

5. A process according to claim 1 wherein the compound is potassium chloride or ammonium chloride or a mixture thereof.

6. A process according to claim 1 wherein the waste water is of coal or ore mining, chemical industrial, food industrial or communal origin.

7. A process according to claim 6 wherein an additional inert filtering auxiliary is added with a particle size of from 0.001 to 2000 $\mu$m, in a concentration of from 0.001 to 500 kg/m$^3$ slurry volume.

8. A process according to claim 1 wherein the compound is added to a circulation system.

9. A method defined in claim 1 wherein the solids are separated from the liquid in step (c) by sedimentation.

10. The method defined in claim 1 wherein the solids are separated from the liquid in step (c) by filtration.

* * * * *